United States Patent
Cao et al.

(10) Patent No.: US 7,567,350 B2
(45) Date of Patent: Jul. 28, 2009

(54) APPARATUS AND METHOD FOR MEASURING DISPLACEMENT, SURFACE PROFILE AND INNER RADIUS

(75) Inventors: Hong-Xi Cao, Hsinchu Hsien (TW); Jen-Chuen Liao, Hsinchu Hsien (TW); Ricky Hsu, Hsinchu Hsien (TW); Sheng-Jang Cheng, Hsinchu Hsien (TW); Ji-Bin Horng, Hsinchu Hsien (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 345 days.

(21) Appl. No.: 11/439,228

(22) Filed: May 24, 2006

(65) Prior Publication Data

US 2006/0268286 A1    Nov. 30, 2006

(30) Foreign Application Priority Data

May 25, 2005    (TW)    .............................. 94117011 A

(51) Int. Cl.
*G01B 11/14* (2006.01)

(52) U.S. Cl. ...................................... 356/614; 356/601
(58) Field of Classification Search ......... 356/601–624, 356/600
See application file for complete search history.

(56) References Cited

U.S. PATENT DOCUMENTS

| | | | | |
|---|---|---|---|---|
| 4,585,349 A * | 4/1986 | Gross et al. ................ 356/624 |
| 4,725,721 A * | 2/1988 | Nakamura et al. ........ 250/201.5 |
| 4,828,390 A | 5/1989 | Miyoshi |
| 4,864,147 A | 9/1989 | Ikari et al. |
| 4,897,536 A | 1/1990 | Miyoshi |
| 4,964,727 A * | 10/1990 | Huggins ..................... 356/617 |
| 4,965,441 A * | 10/1990 | Picard ..................... 250/201.3 |
| 5,424,834 A | 6/1995 | Akedo et al. |
| 5,526,338 A * | 6/1996 | Hasman et al. ............... 369/94 |
| 5,608,529 A * | 3/1997 | Hori ........................... 356/609 |
| 5,629,773 A * | 5/1997 | Wakai et al. ................. 356/601 |
| 5,785,651 A * | 7/1998 | Kuhn et al. ................. 600/310 |
| 5,880,846 A * | 3/1999 | Hasman et al. ............. 356/602 |
| 6,674,572 B1 * | 1/2004 | Scheruebl et al. ........... 359/368 |
| 6,879,403 B2 * | 4/2005 | Freifeld ..................... 356/601 |
| 7,230,725 B2 * | 6/2007 | Babayoff et al. ............ 356/609 |

* cited by examiner

*Primary Examiner*—Hoa Q Pham
(74) *Attorney, Agent, or Firm*—Rabin & Berdo, P.C.

(57) ABSTRACT

An apparatus and a method are proposed for measuring displacement, surface profile and roughness of a moving object or an inner radius of a hollow cylinder. The apparatus includes a light emitting unit, a light dispersing unit for receiving light from the light emitting unit and focusing rays with different wavelengths into different focal points with different intervals, and a wavelength measuring unit for measuring wavelengths of the rays. When the moving object is moving within a dispersing range of the focal points, the rays with different wavelengths are reflected or scattered, and the displacement of the moving object is learned from variation of the wavelengths being measured by the wavelength measuring unit. Given that a reflecting component is disposed in the centre of an inner circle of the hollow cylinder, the inner radius of the hollow cylinder can be measured by the principle of the apparatus for measuring displacement.

15 Claims, 17 Drawing Sheets

APPARATUS AND METHOD FOR MEASURING DISPLACEMENT, SURFACE PROFILE AND INNER RADIUS

FIELD OF THE INVENTION

The present invention relates generally to measuring apparatuses and methods, and more particularly, to an apparatus and method for measuring displacement, surface profile and inner radius.

BACKGROUND OF THE INVENTION

The trend of industry automation has swept the globe in recent years, which significantly enhances the productivity and yield of products. Under the trend of automation, a steady, reliable and high precision sensing technique is becoming more and more important. The most common precision sensing technique in industrial automation is laser displacement measuring technique which uses a laser as a sensor to measure displacement. There are three basic types of laser displacement measuring methods: time-of-flight, phase difference and triangulation measuring method.

Time-of-flight measuring method uses a modulated laser light to measure the distance. Distance could be determined by the time delay between the same modulation signals between being emitted and observed. Phase difference measuring method measures the distance by the modulation signal phase difference between the emitted and received laser light. The triangulation measuring method, disclosed for example in U.S. Pat. No. 4,864,147 "Optically Scanning Displacement Sensor with Linearity Correction Means" and U.S. Pat. No. 4,897,536 "Optical Axis Displacement Sensor with Cylindrical Lens Means", use laser as a index to measure the distance by the geometrical relation between the object and optical sensor as photodiodes (PD) array. However, triangulation measuring method has strict requirements for structural stability of the system and the sensibility of the PD array sensor. The applications of the above-described laser measuring methods are different, but they all demand highly sensible receivers and precision electronic circuits, causing the cost of the products becoming too high.

In addition, U.S. Pat. No. 4,828,390 "Optical Axis Displacement Sensor" proposes an optical axis displacement sensing technique, which takes the optical axis of the instrument structure for reference, i.e., takes the optical axial position of the receiver as zero. The position variation of the measured object can be deduced by obtaining the position variation of the receiver. This technique also requires high structural stability of the system and accurate arrangement of the lens. The technique further requires a moving component, which not only increases the cost, but also reduces structural stability of the system.

Furthermore, U.S. Pat. No. 5,424,834 "Optical Displacement Sensor for Measurement of Shape and Coarseness of a Target Workpiece Surface" proposes a laser confocal scanning technique. According to the optical confocal manner, different positions will have different distributions of the light intensity, indicating position variation of the measured object, thus the displacement of the measured object can be measured. However, problems such as strict structural stability of the system and component assembling (e.g., pinhole focusing) still exist in such technique, which is adverse to system stability and reduction of cost.

Accordingly, there exists a strong need in the art for a simple measuring method that obtains better displacement measuring result with reduced cost.

SUMMARY OF THE INVENTION

Accordingly, it is an objective of the present invention to solve the problems of the aforementioned conventional technology by providing an apparatus and method for measuring displacement, surface profile and the inner radius as a hollow cylinder.

In order to attain the above and other objectives, a apparatus for measuring displacement, surface profile and the inner radius is proposed, which comprises at least a light source, a device which focus different wavelengths at different focal points which form a detection range, and a device which measure wavelengths. When the measured object is in the detection range, it will reflect different wavelengths back to the light source. A unique wavelength which is best focused on the position of the measured object will dominate. Light of other wavelengths suffer larger loss due to the defocus. Therefore, the position of measured object can be learned from the weight center of spectrum. Furthermore, given an optical component as a mirror in the hollow cylinder to deflect the light direction, the inner radius of the hollow cylinder can be measured by the principle which is mentioned above.

A method for measuring displacement is also proposed. It comprises several steps. First, provide a light source. Next, focus the light with different wavelengths of the light source into different focal points, which is called dispersion. And when the measured object is put in the range of the focal points, the rays with different wavelengths will be scattered back to the light source. Then measure the weight center of the light in total. The position of the measured object will be known. The surface profile of the measured object can be learned form moving the object under measurement in a 2D surface scan and recording the displacement of the measured object continuously.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

With reference to FIGS. 1, 2(A) through 2(D), 3, 4(A) through 4(D) and 5(A) through 5(F), depicted are diagrams related to the apparatus and method for measuring displacement and apparatus for measuring the inner radius according to the present invention, the preferred exemplary embodiments of the apparatus and method for measuring displacement and apparatus for measuring the inner radius in the present invention will be described in conjunction with these drawings. It should be noted that the drawings are all simplified schematic diagrams and merely illustrate the basic structures and components pertaining to the present invention. Additionally, the illustrated components may not be drawn to actual quantity, shape, position, size etc., which are only a matter of design choice, so the actual layout of the components may be more complex.

Figure 1:
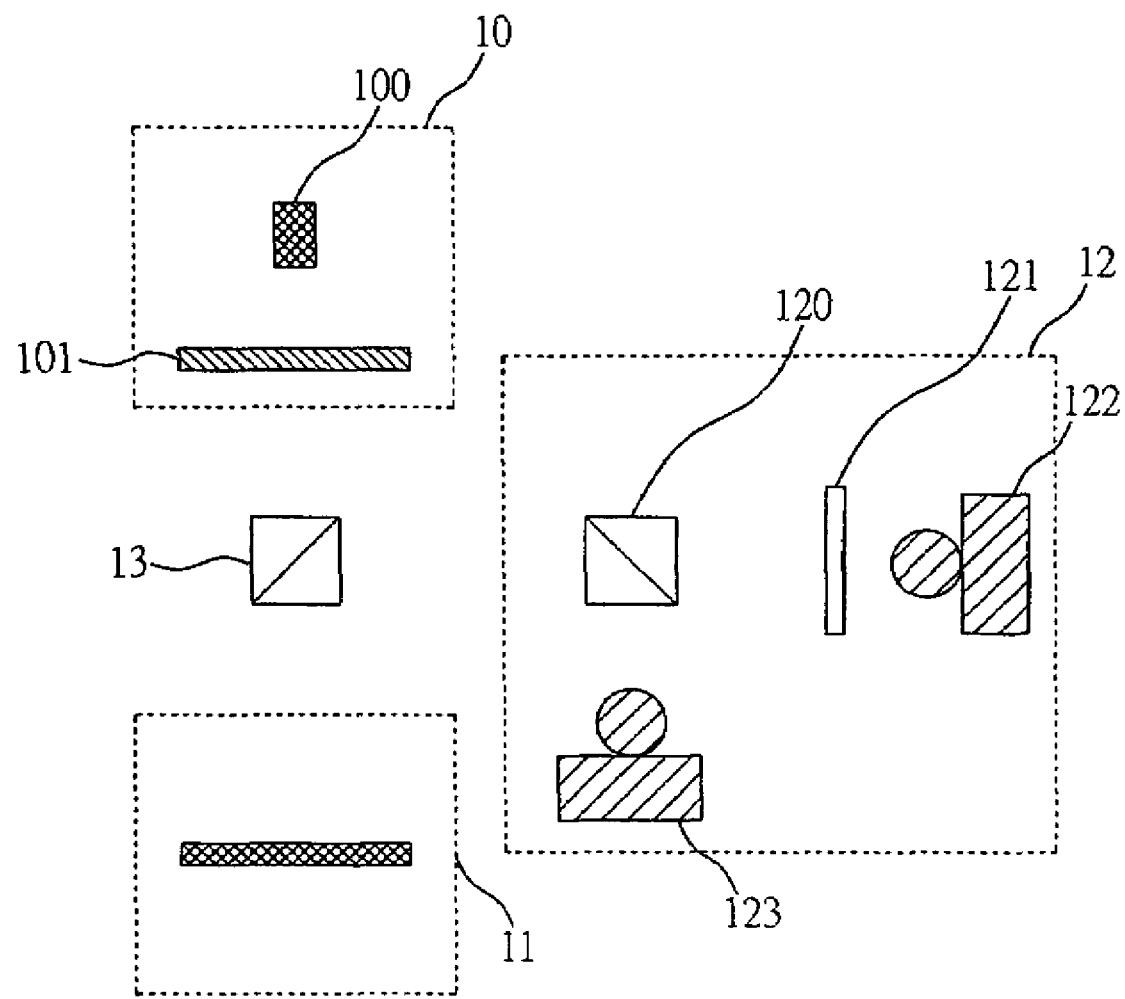
FIG. 1 depicts a plan sketch of the basic structure of the apparatus for measuring displacement according to a first embodiment of the present invention.

With reference to FIG. 1, shown is the basic structure of the apparatus for measuring displacement according to a first embodiment of the present invention. It is used to measure the displacement of a moving object. The apparatus for measuring displacement comprises at least a light emitting unit 10 for providing light source, a light dispersing unit 11 for receiving the light from the above-described light emitting unit 10 and respectively focusing the rays with different wavelengths in the light source to focal points at different intervals, and a wavelength measuring unit 12 for measuring the wavelength of the rays.

Figure 2A:
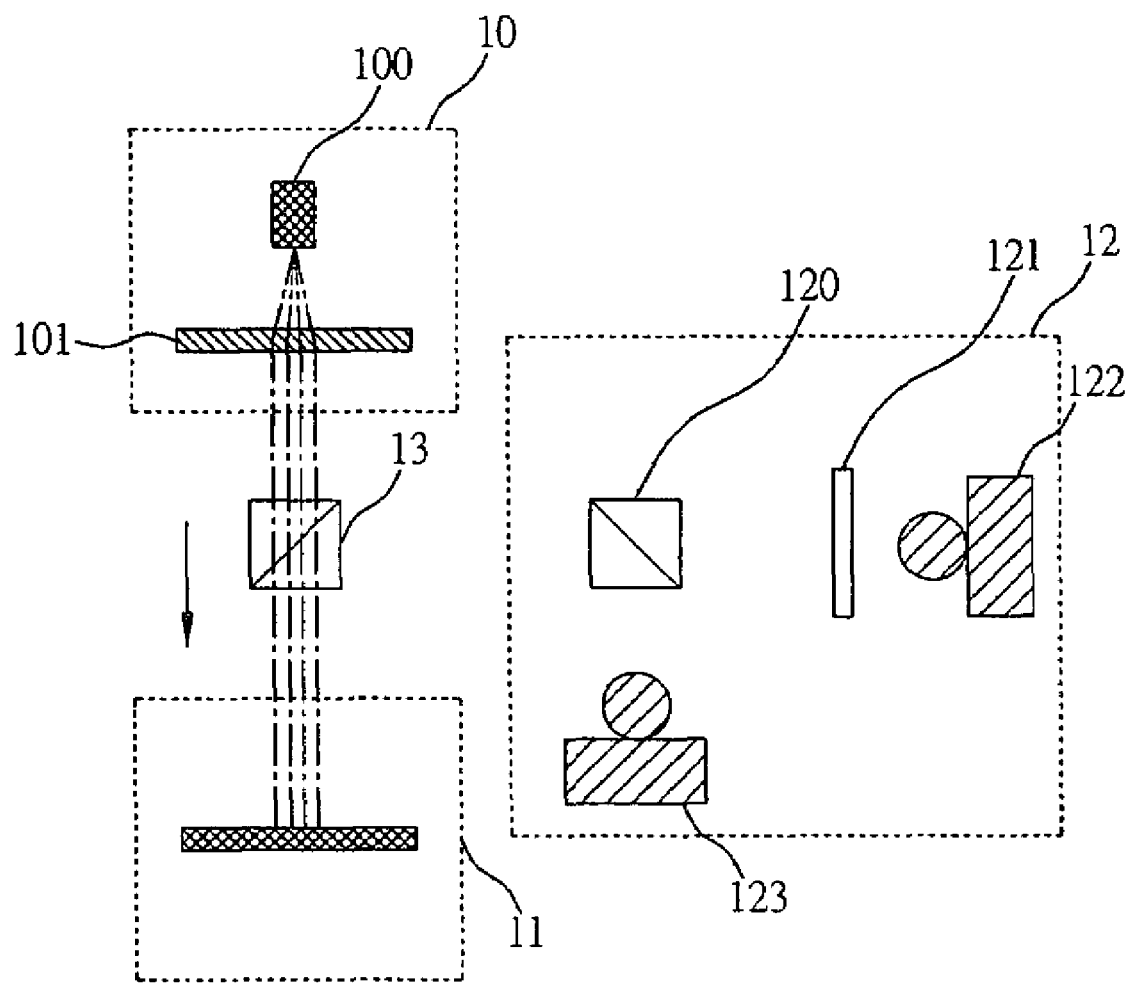
FIGS. 2(A) through 2(D) depict continuous operations of the ray propagating sequence of the apparatus for measuring displacement according to the first embodiment of the present invention.
Figure 2B:
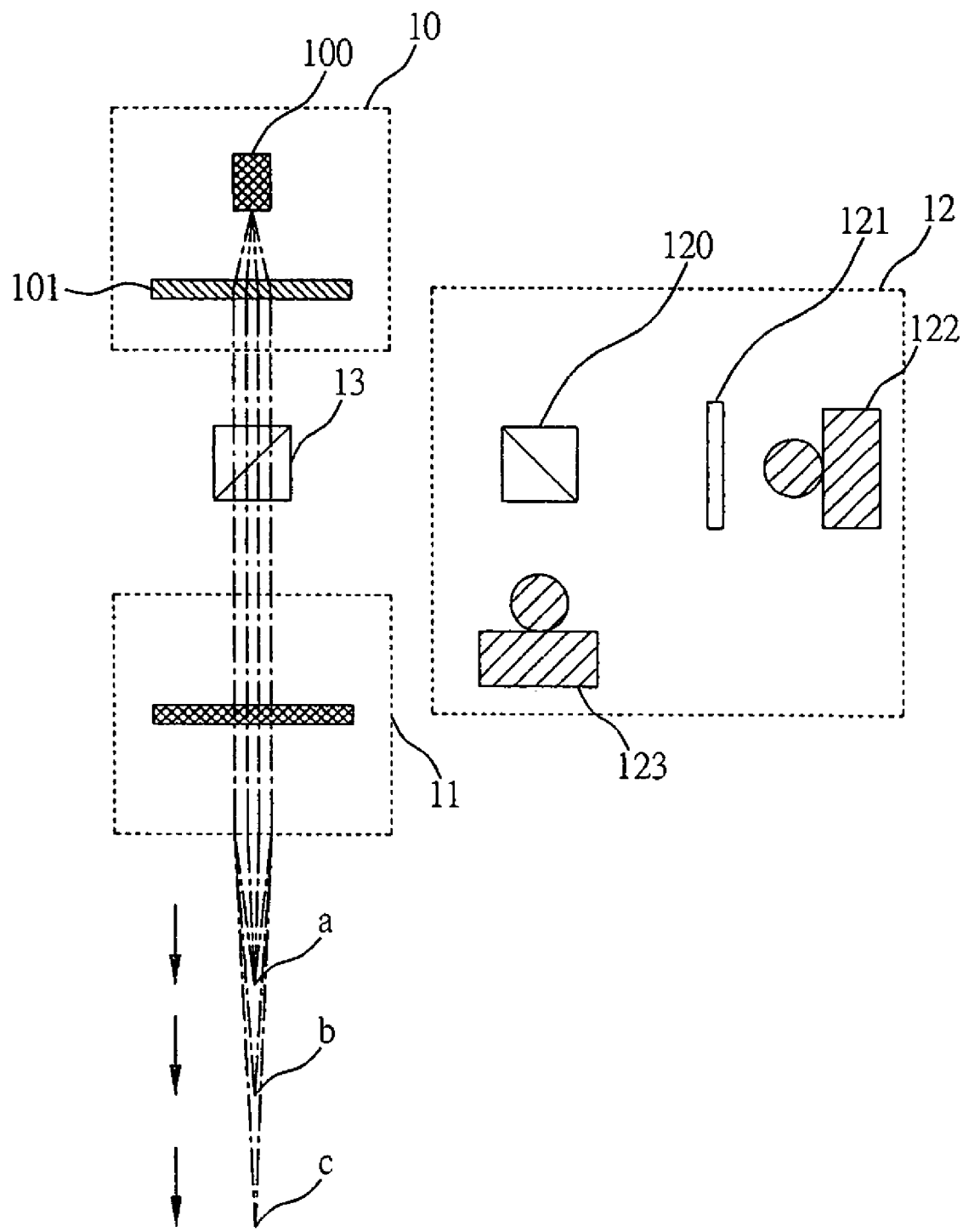
Figure 2C:
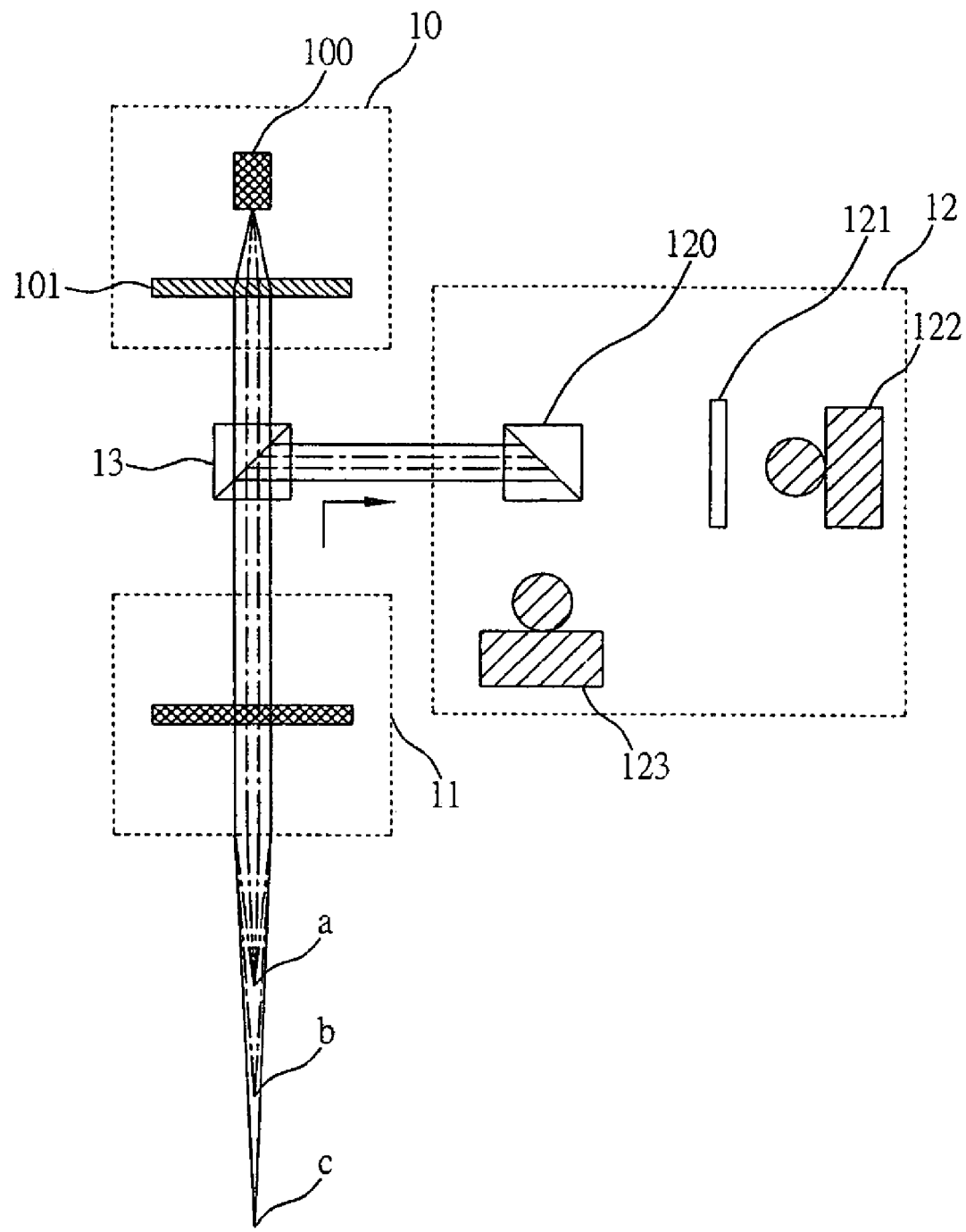
Figure 2D:
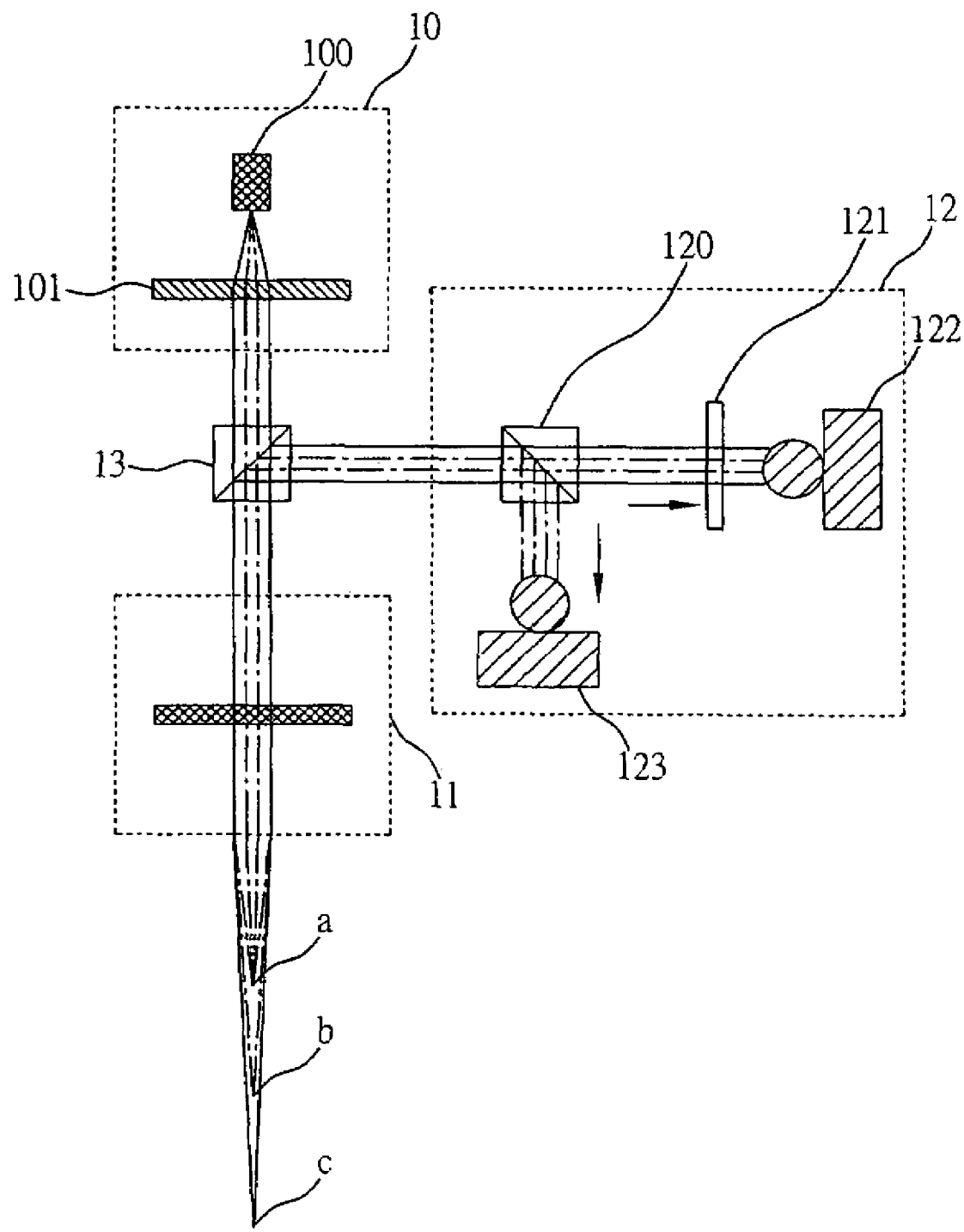

With additional reference to FIGS. 2(A) through 2(D), shown are schematic diagrams of the ray propagation according to this embodiment. Firstly, referring to FIG. 2(A), the light emitting unit 10 provides the light source for the light dispersing unit 11. Referring next to FIG. 2(B), the rays with different wavelengths in the light source are respectively focused into focal points with different intervals (only three focal points labeled as a, b, c are depicted for this embodiment, however, the number of actual focal points is infinite) by the light dispersing unit 11. Then referring to FIG. 2(C), when the measured object is at focal point a, the ray focusing at point a will be reflected to unit 10 and dominate the wavelength of the light. Finally referring to FIG. 2(D), the reflected ray is measured by the wavelength measuring unit 12, such that its primary wavelength (such as λa) can be obtained, thus, when the measured object moves to focal point b, the ray focusing at point b will be reflected to unit 10 and dominate the wavelength of the light. The primary wavelength (such as λb) of the reflected ray can be measured by the wavelength measuring unit 12. The distances of the focal points corresponding to various wavelengths (such as λa, λb) can be known in advance according to the optical design of the light dispersing unit 11, thereby the distance of various surfaces can be measured. The displacement of the measured object from the focal point a to focal point b can be obtained after subtracting the distance to which the primary wavelength (such as λa) in the first ray corresponds from the distance to which the primary wavelength (such as λb) in the second ray corresponds. If the measured object or the apparatus for measuring displacement is fixed, the profile or roughness of the measured object can be measured through translating another object by means of the displacement platform with known displacement.

According to the aforementioned descriptions in conjunction with the drawings, the technical feature disclosed in this embodiment is that when the measured object is within infinite number of focal points (such as a, b and c), rays with different wavelength distributions will be reflected and only the wavelength focusing on the measured object can dominate the wavelength of the light. The wavelength of the rays is measured by the wavelength measuring unit 12; thereby the displacement of the measured object can be learned from the variation of the wavelength. In addition, a optical signal separating component 13 is further disposed between the light dispersing unit 11 and the wavelength measuring unit 12 for unit 12 to get the reflected ray for measuring wavelength.

The various components in the first embodiment of the apparatus for measuring displacement of the present invention will now be described in more detail.

The aforementioned light emitting unit 10 includes a light emitting component 100 for providing a light source and a first modulating component 101 for receiving the light beam from the light emitting component 100 and focusing the light beam into suitable light beam. The light emitting component 100 can be embodied as at least one of a broadband semiconductor laser light source component and the broadband laser light amplifier. The light source provided by the light emitting component 100 can be a group composed of one or at least two of a LED (light-emitting diode) light source, a LD (laser diode) light source, a solid laser light source, a liquid laser light source, a gaseous laser light source, a excimer laser light source and a fiber laser light source.

The light dispersing unit 11 can be implemented as one of a spherical lens, an aspheric lens, a graded index lens, a prism, a fresnel and a reflector or a group composed of one of the above, or alternatively, a group composed of at least any two of a spherical lens, an aspheric lens, a graded index lens, a prism, a fresnel and a reflector.

The wavelength measuring unit 12 comprises a second optical signal separating component 120 for receiving the rays from the first optical signal separating component 13 and separating the rays into a first light beam and a second light beam, a first filtering component 121 for receiving the first light beam and attenuating the first light beam to a third light beam, a first photosensor 122 for receiving the third light beam and measuring a first light intensity of the third light beam, and a second photosensor 123 for receiving the second light beam and measuring a second light intensity of the second light beam. The wavelength measuring principle is that the attenuation rate of the first filtering component 121 is correlative with the wavelength (attenuation is a function of wavelength), thereby average wavelength of the rays that is reflected back from the measured object can be learned by comparing the first light intensity and the second light intensity.

Wherein, the first optical signal separating component 13 and the second optical signal separating component 120 of the wavelength measuring unit 12 can be embodied as one or a group composed of at least one of a splitter, a prism, a grating, an optical splitter, a fiber coupler and a photon crystal element, or alternatively, a group composed of at least any two of a splitter, a prism, a grating, an optical splitter, a fiber coupler and a photon crystal element.

The first filtering component 121 can be embodied as one or a group composed of at least one of a thin filter, an etalon, a grating and a fiber grating, or alternatively, a group composed of at least any two of a thin filter, an etalon, a grating and a fiber grating.

The first photosensor 122 and the second photosensor 123 can be embodied as one or a group composed of at least one of a semiconductor photo detector, a CCD (Charge Couple Device), a CMOS (Complementary Metal Oxide Semiconductor) and a PSD (Position Sensitive Device).

Figure 3:
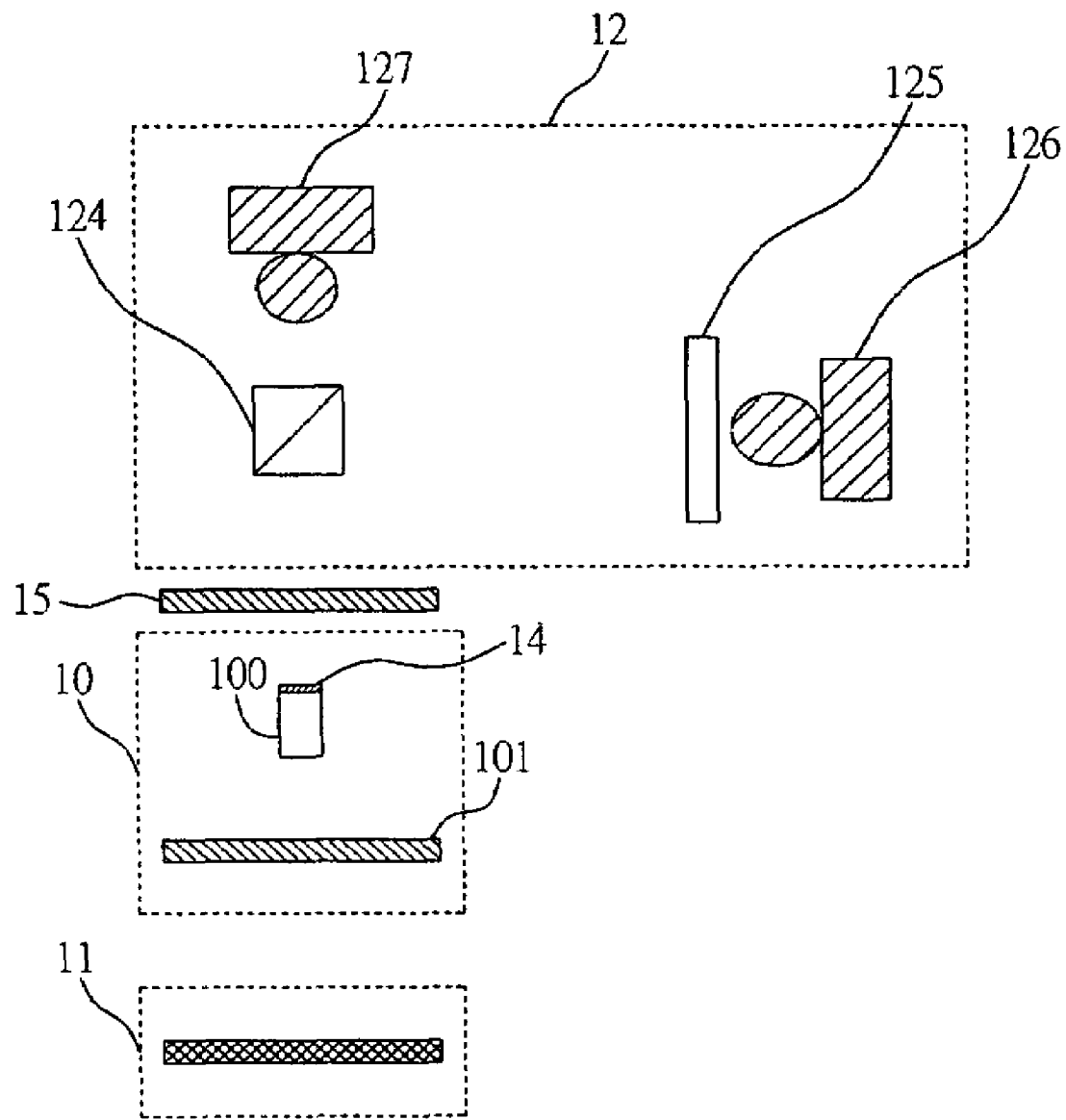
FIG. 3 depicts a plan sketch of the basic structure of an apparatus for measuring displacement according to a second embodiment of the present invention.

With reference to FIG. 3, shown is the basic structure of the apparatus for measuring displacement according to a second embodiment of the present invention. It is also used to measure the displacement of a moving object. The apparatus for measuring displacement, similar to the first embodiment, comprises a light emitting unit 10 for providing a light source, a light dispersing unit 11 for receiving the light source from the above-described light emitting unit 10 and respectively focusing rays with different wavelengths of the light source to the focal points with different intervals, and a wavelength measuring unit 12 for measuring the dominative wavelength of the light.

Figure 4A:
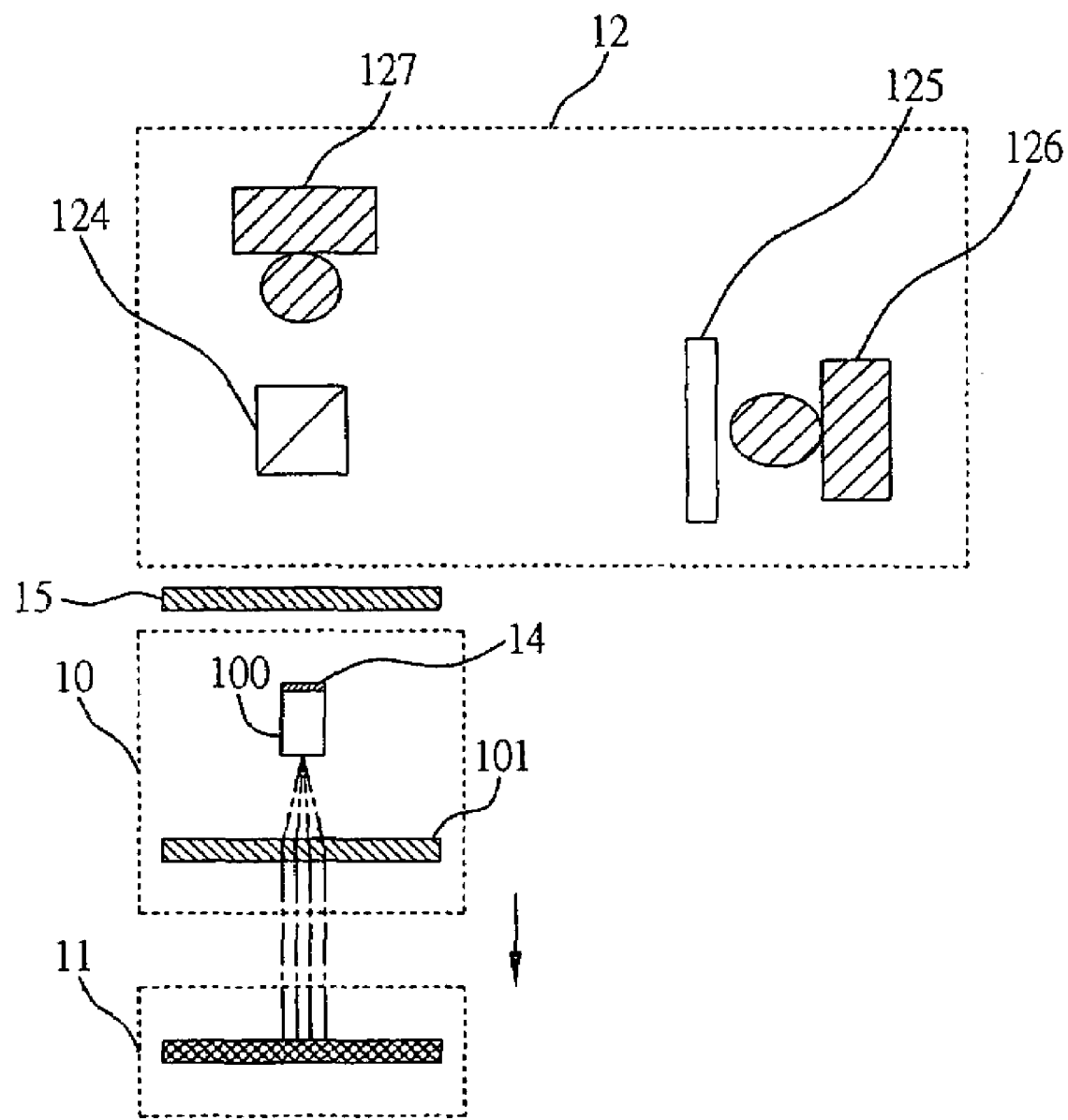
FIGS. 4(A) through 4(D) depict continuous operations of the ray propagating sequence of the apparatus for measuring displacement according to the second embodiment of the present invention.
Figure 4B:
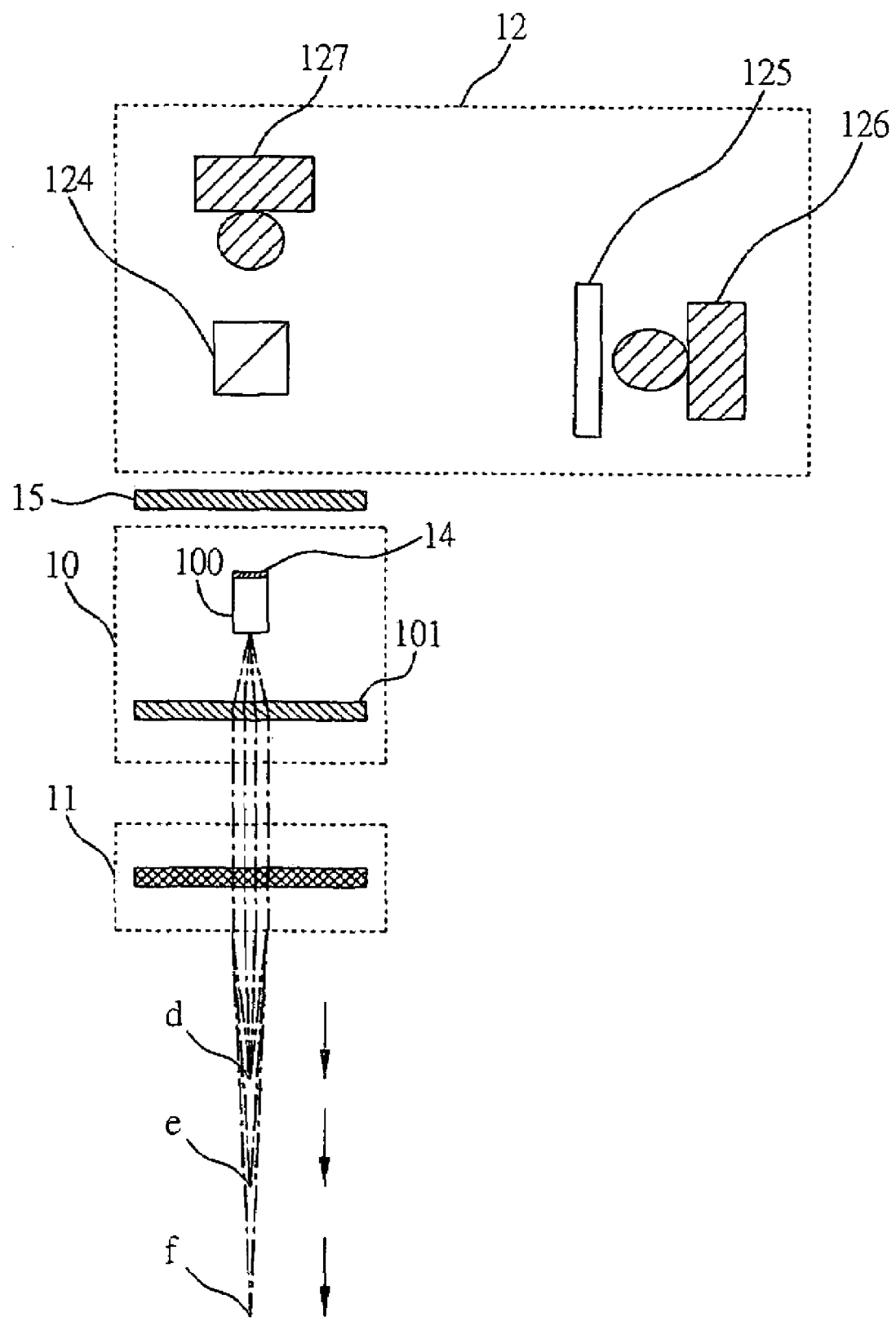
Figure 4C:
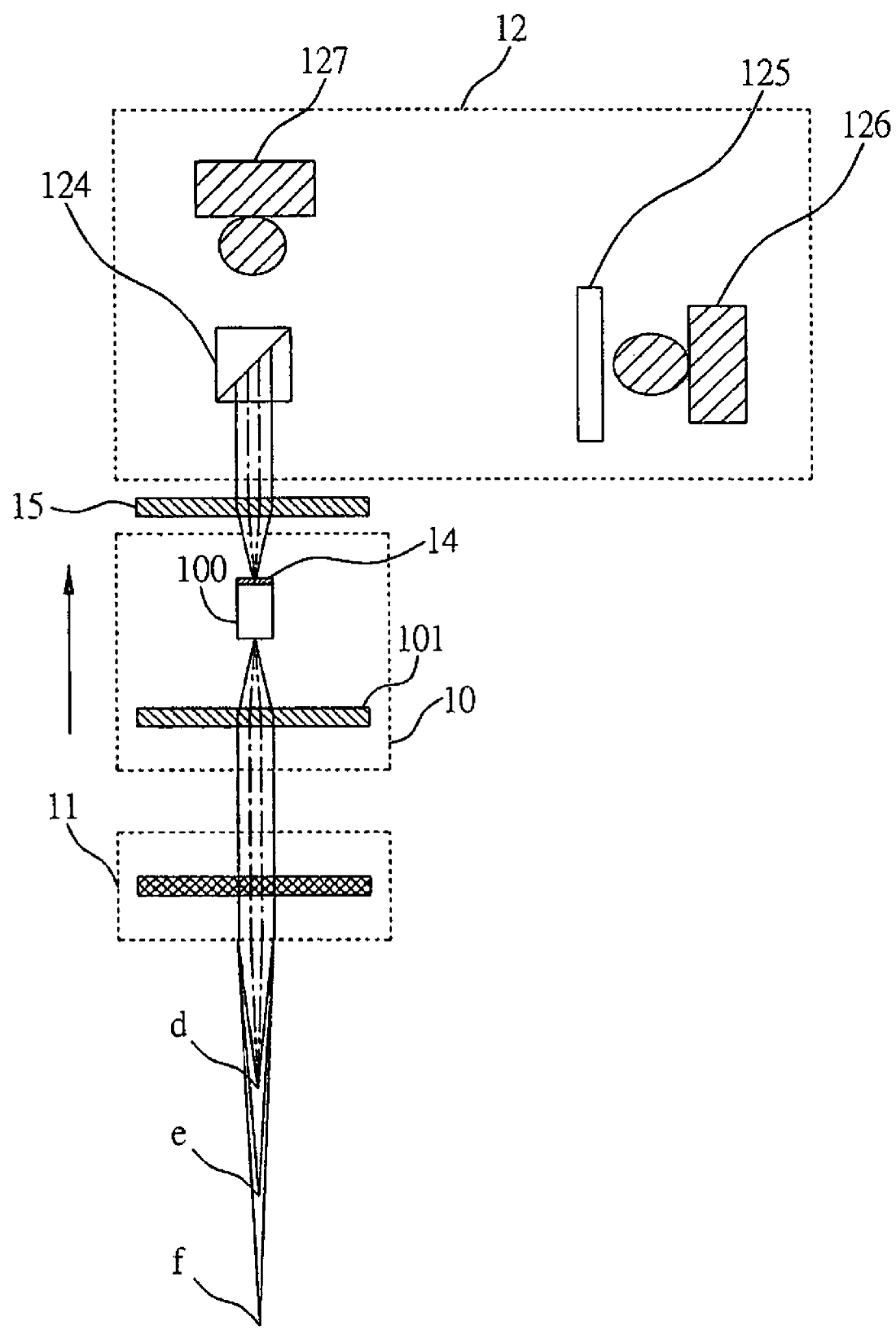
Figure 4D:
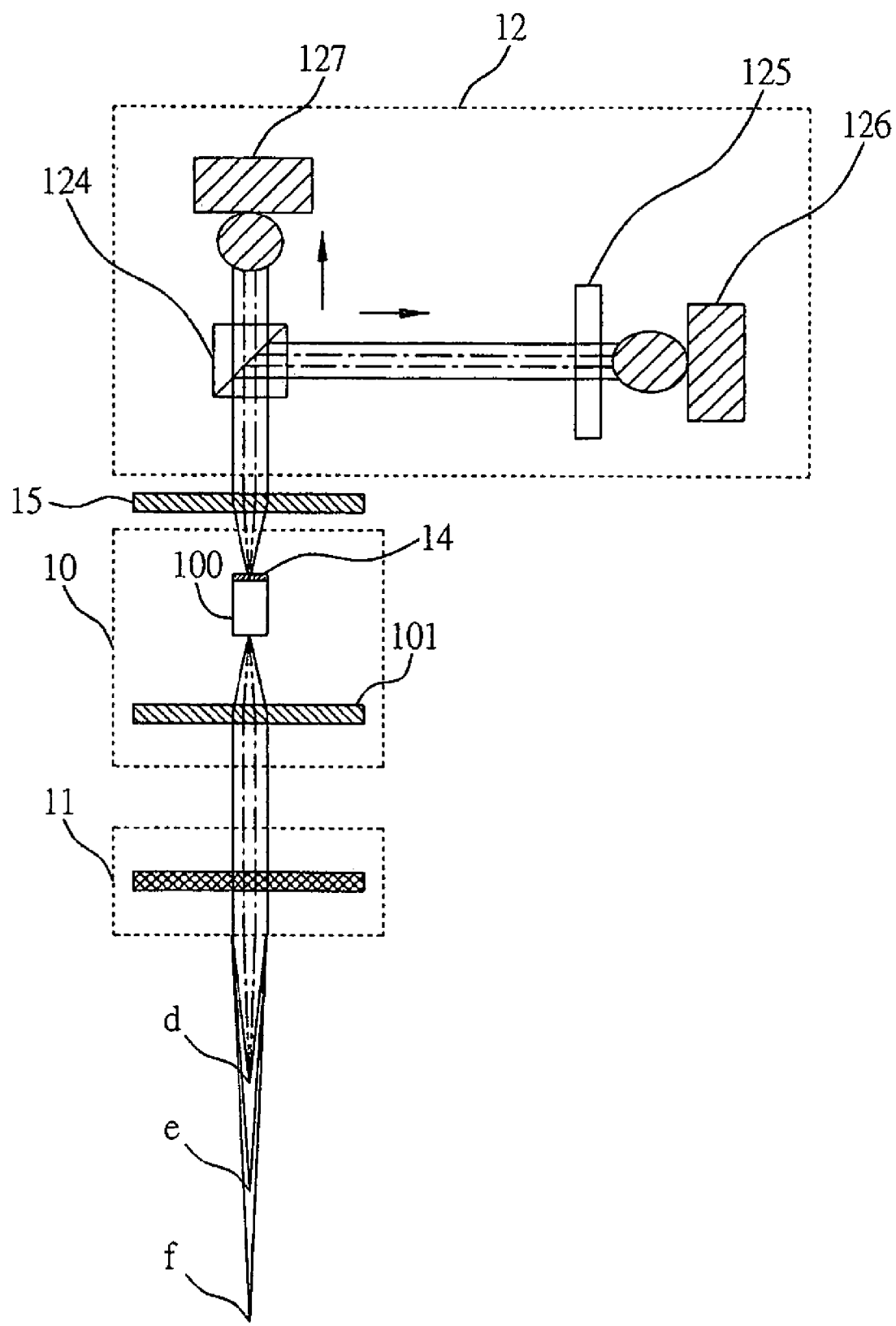

With additional reference to FIGS. 4(A) through 4(D), shown are schematic diagrams of the ray propagation according to the second embodiment. Firstly, referring to FIG. 4(A), the light emitting unit 10 provides the light source for the light dispersing unit 11. Referring next to FIG. 4(B), the rays with different wavelengths in the light source are respectively focused to different focal points with different intervals (only three focal points labeled as d, e, f are depicted for this embodiment, however, the number of actual focal points is infinite) by the light dispersing unit 11. When the measured object is at the focal point f, the ray focusing on point f will be reflected as shown in FIG. 4(C). Finally referring to FIG. 4(D), the reflected ray is measured by the wavelength measuring unit 12, so that its primary wavelength (such as λf) can be obtained, thus, when the measured object moves to the focal point e, a ray focusing at point e with different wavelength from the wavelength of the ray focusing at point f will be returned, the primary wavelength (such as λe) of the ray can also be measured by the wavelength measuring unit 12. The distances of the focal points corresponding to various wavelengths (such as λf, λe) can be known in advance according to the optics design of the light dispersing unit 11, thereby the distances of various surfaces can be measured. The displacement of the measured object from the focal point f to focal point e can be obtained after subtracting the wavelength of λf from the wavelength of λe. If the measured object or the apparatus for measuring displacement is fixed, the profile or roughness of the measured object can be measured through translating another object by means of the displacement platform with known displacement.

According to the aforementioned descriptions and drawings, the technical feature disclosed in the embodiment is similar to the first embodiment, but this embodiment differs from the first embodiment in that a partial penetrating component 14 as optical coating layer is provided on the surface of the light emitting component 100, the partial penetrating component 14 allow the rays returned from the measured object passing through the light emitting component 100. In addition, a second modulating component 15 as a lens is further provided between the wavelength measuring unit 12 and the light emitting component 100 for collecting rays reflected from the light emitting component 100 to the wavelength measuring unit 12.

In this embodiment, the light emitting component 100 is provided with the partial penetrating component 14 on the surface, allowing rays to pass through, and the wavelength measuring unit 12 is disposed at this position, thereby not only enhancing efficiency of the space and light energy utilization, but also attaining the same effect as the first embodiment.

The various components in the second embodiment of the apparatus for measuring displacement of the present invention will now be described in more detail.

The wavelength measuring unit 12 comprises a optical signal separating component 124 for receiving the rays from the modulating component 15 and separating the rays into two beams, a second filtering component 125 for receiving a beam and attenuating its light intensity, a photosensor 126 for receiving the attenuated light beam and measuring its light intensity, and another photosensor 127 for receiving the other light beam and measuring the light intensity. The wavelength measuring principle is that the attenuation ratio of the second filtering component 125 is correlative with the wavelength (attenuation=function of wavelength), thereby wavelength of the rays that is reflected by the measured object moving within the range of focal points can be learned by comparing the light intensity received by photosensor 126 and photosensor 127.

In this embodiment, the exemplary embodiment of the optical signal separating component 124 is identical to that of the first optical signal separating component 13 and the second optical signal separating component 120 described in the first embodiment; the exemplary embodiment of the second filtering component 125 is identical to that of the first filtering component 121 described in the first embodiment; the exemplary embodiments of the third photosensor 126 and the fourth photosensor 127 are identical to that of the first photosensor 122 and the second photosensor 123, thus they will not be repeatedly.

Furthermore, a method for measuring displacement corresponding to the apparatus for measuring displacement is disclosed in the present invention. The method comprises, firstly, a light source with multiple wavelengths or a broad band spectrum is provided, then, respective rays with different wavelengths in the light source is gathered into respective focal points with different intervals, and when the measured object is in the range of these focal points, a ray with particularly wavelength distributions can be returned, next, the wavelengths of the returned rays are measured, thereby the displacement of the measured object can be learned from the variation of the wavelength. Accordingly, the displacement of the measured object can be obtained by the method of the present invention without complicated measuring steps.

Figure 5A:
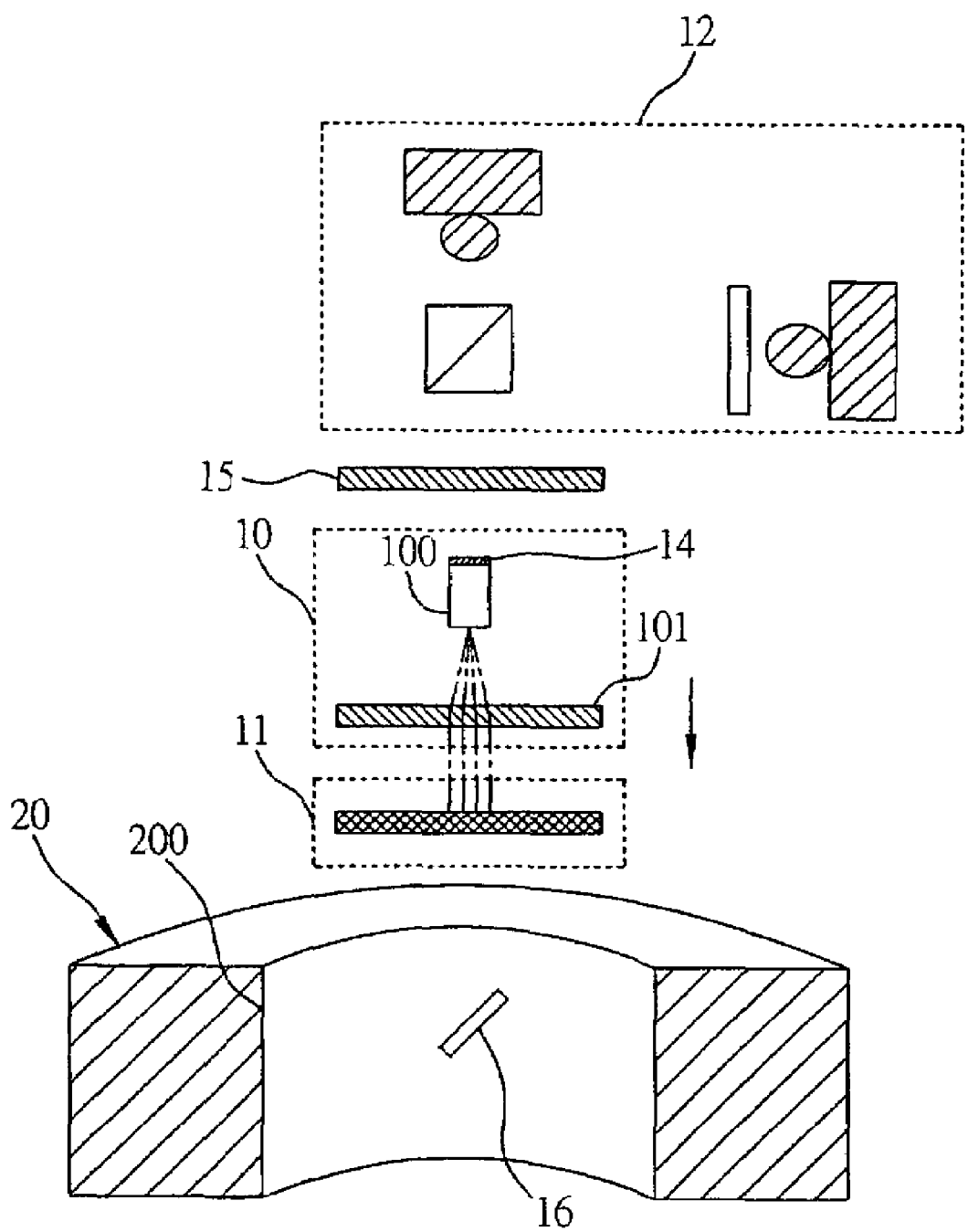
FIGS. 5(A) through 5(F) depict continuous operations of the ray propagating sequence of the apparatus for measuring the inner radius according to the present invention.
Figure 5B:
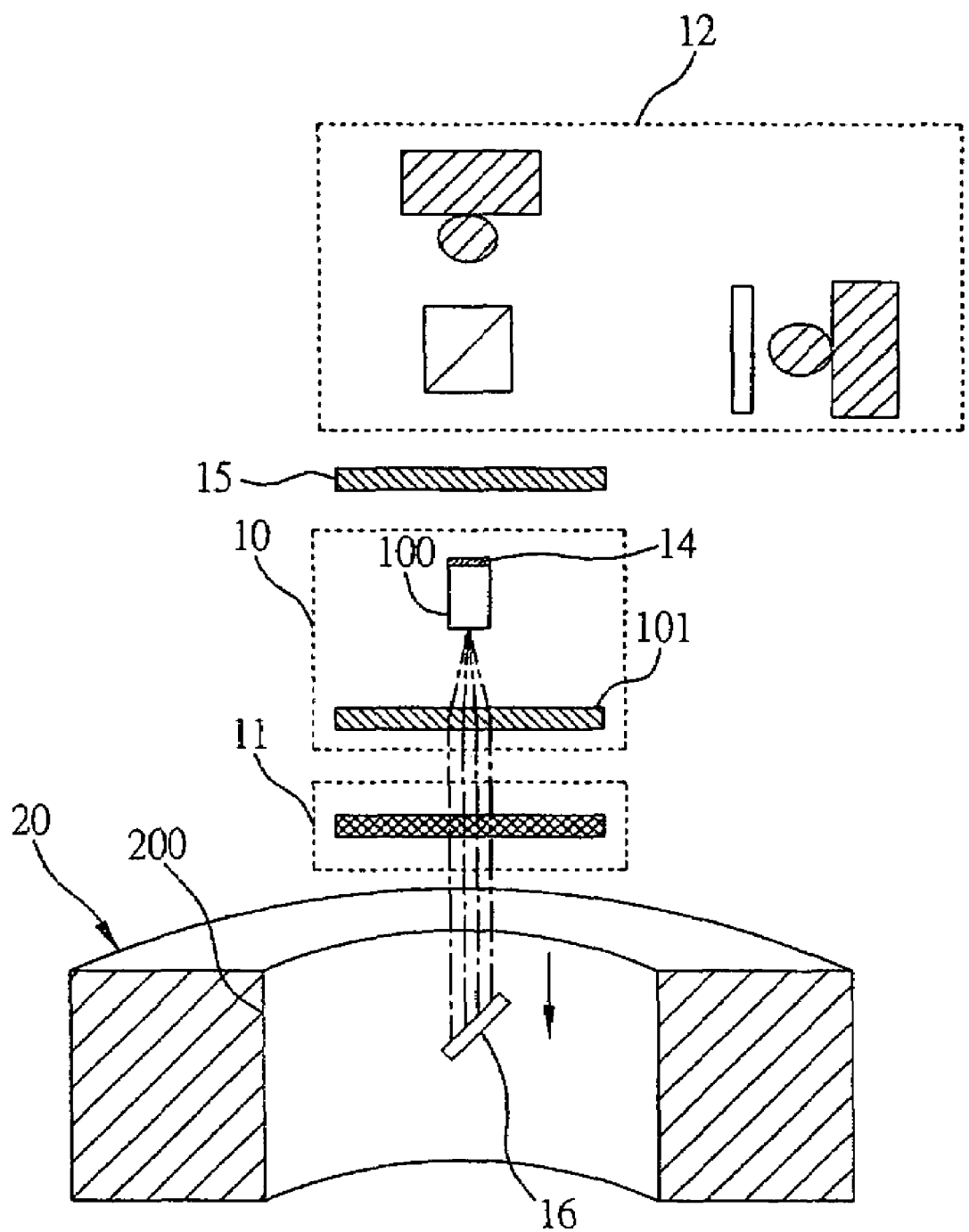
Figure 5C:
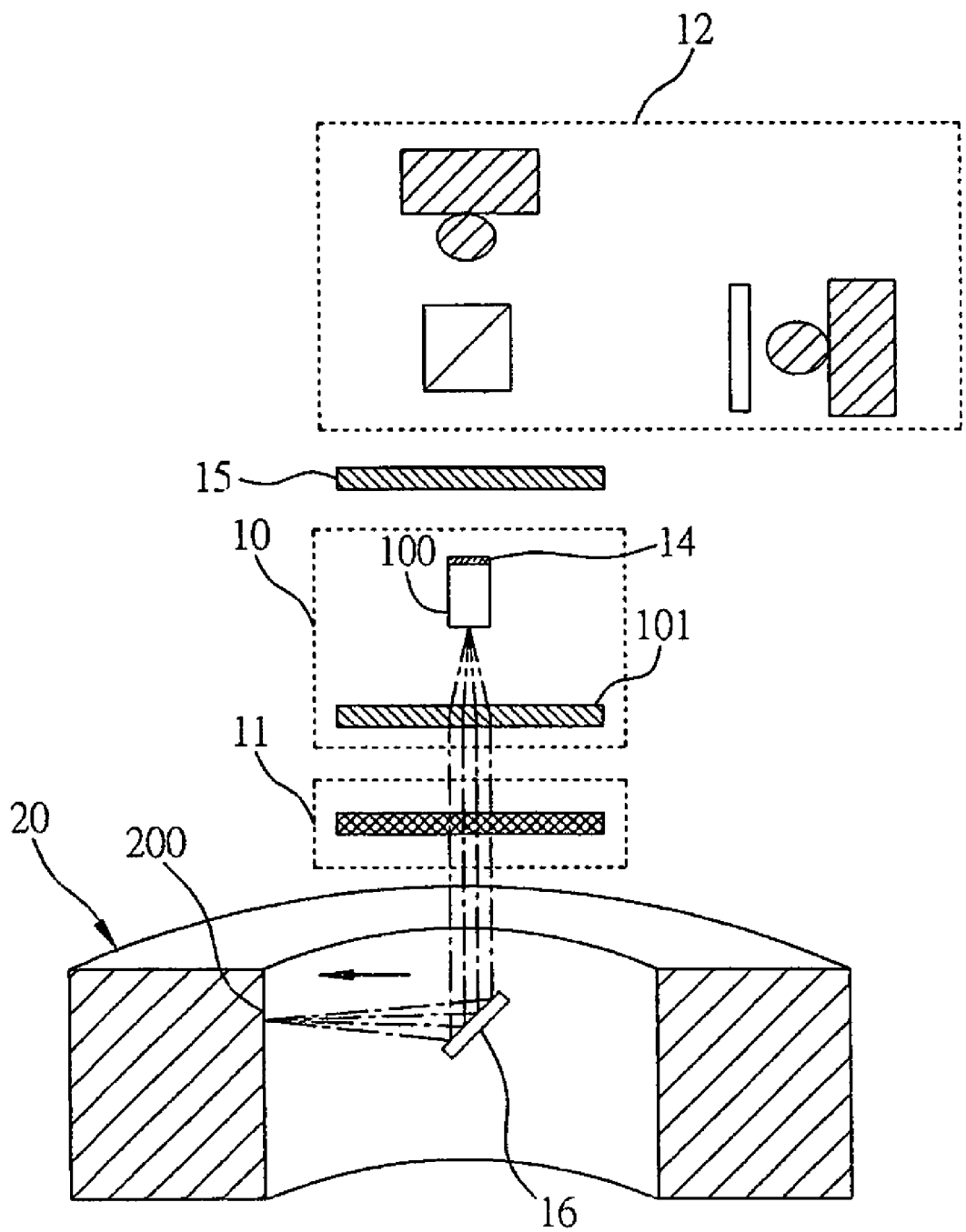

With reference to FIGS. 5(A) through 5(B), shown are schematic diagrams of the ray propagation of the apparatus for measuring the inner radius according to the present invention, the apparatus for measuring the inner radius is used to measure the inner radius of a hollow cylinder 20, its basic structure comprises a light emitting unit 10 for providing a light source, a light dispersing unit 11 for receiving the light from the light emitting unit 10 and respectively focusing rays with different wavelengths in the light source into the focal points with different intervals, a reflecting component 16 disposed in the centre of the inner circle of the hollow cylinder 20, and a wavelength measuring unit 12 for measuring the wavelength of the rays.

Figure 5D:
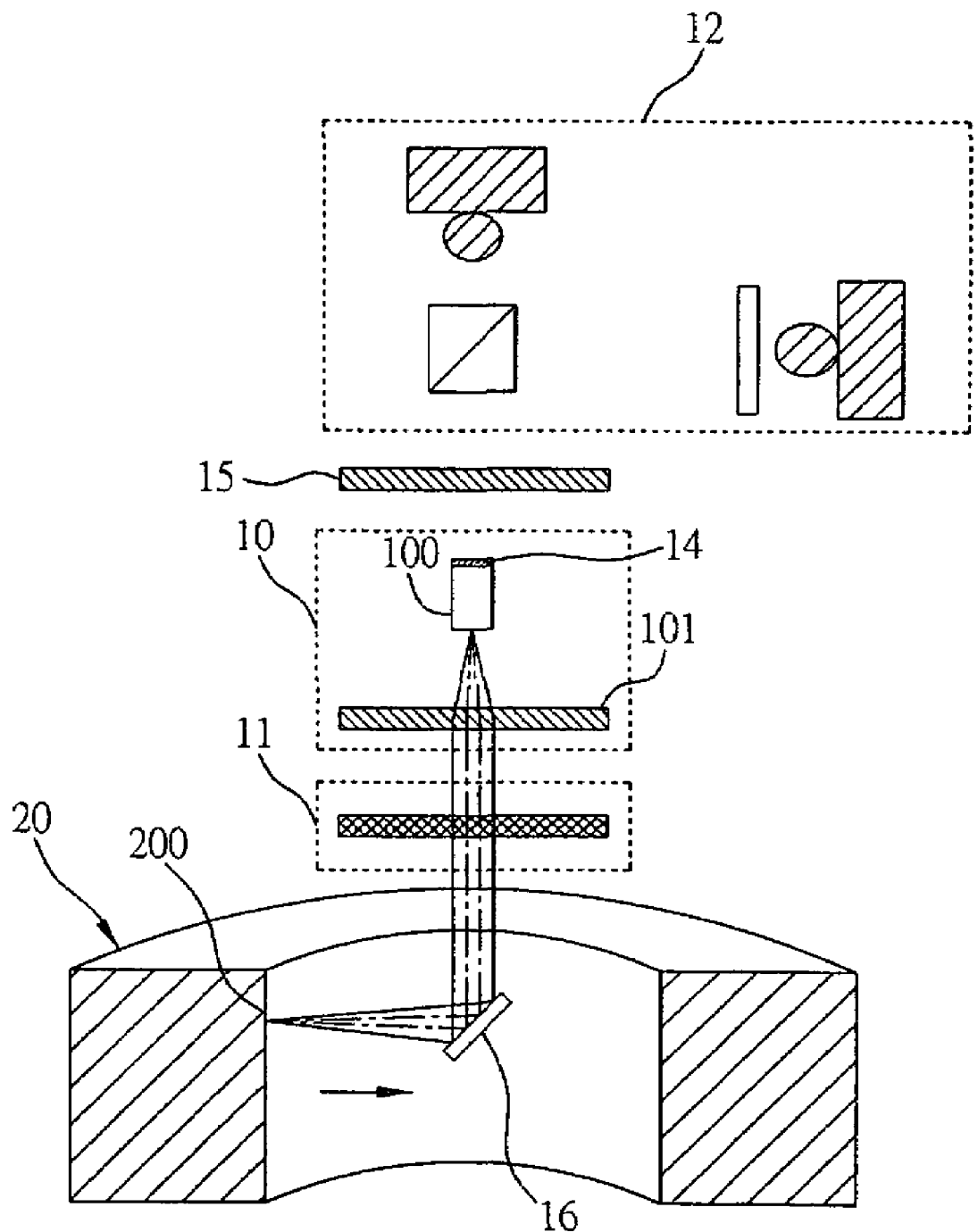
Figure 5E:
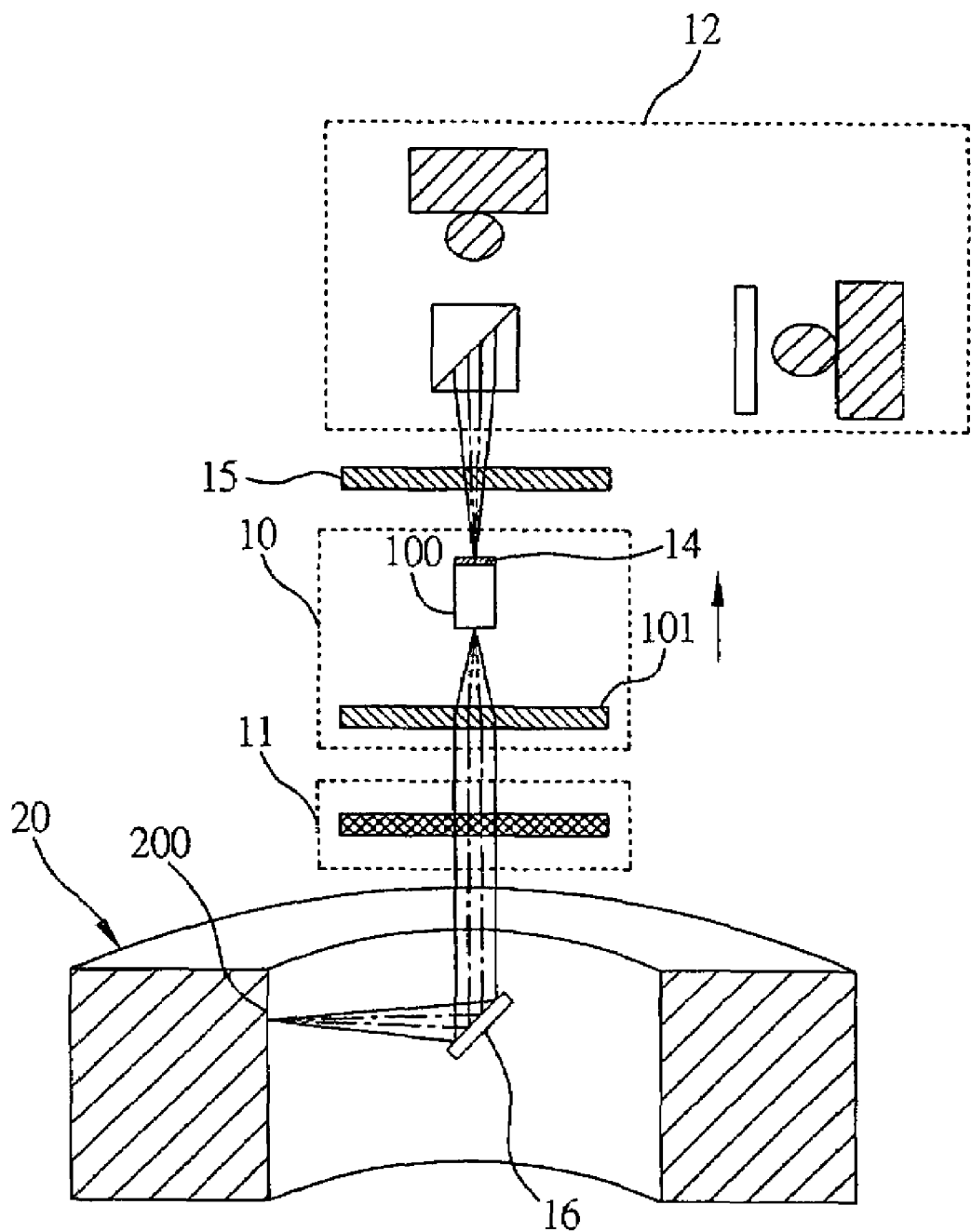
Figure 5F:
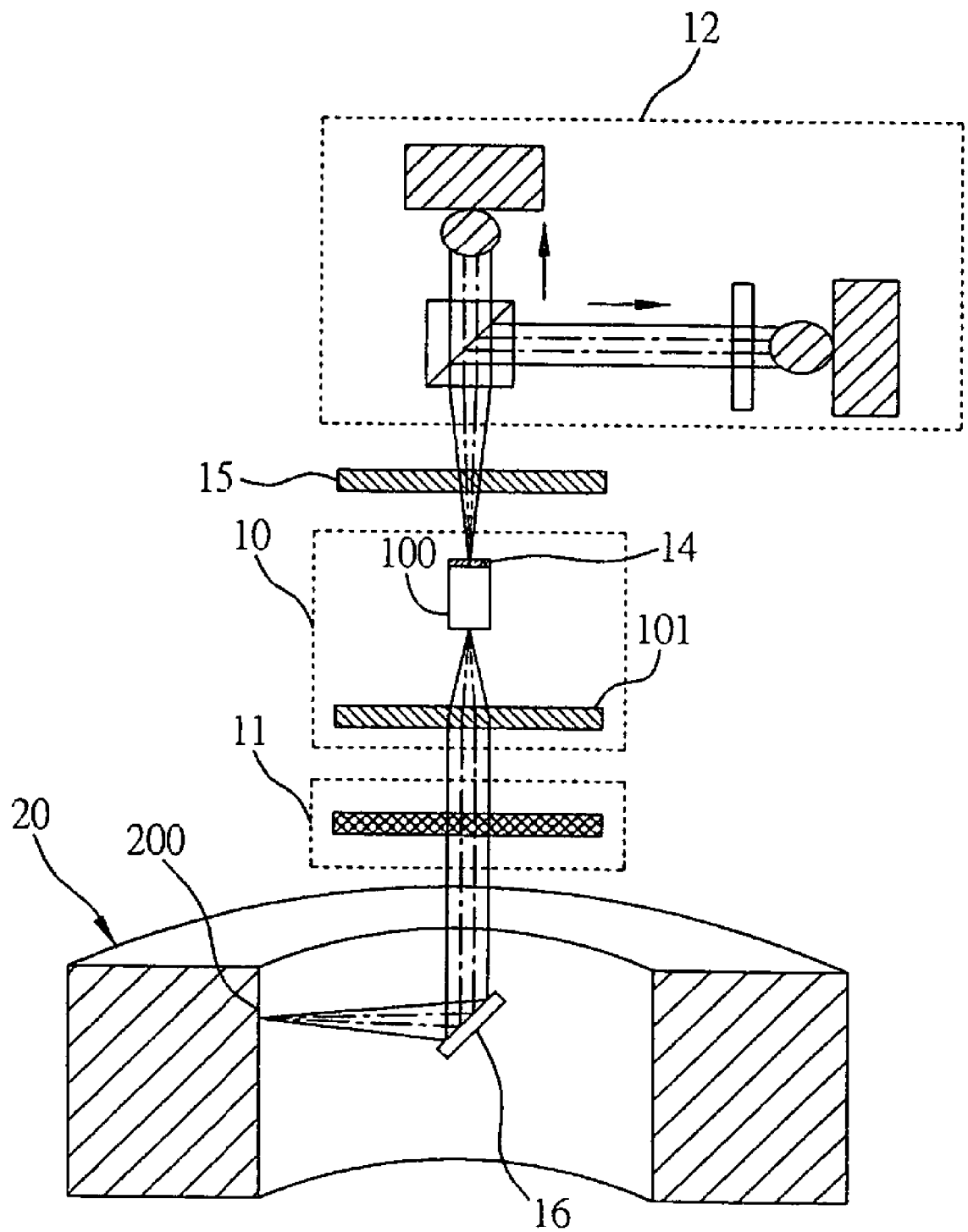
Figure 6:
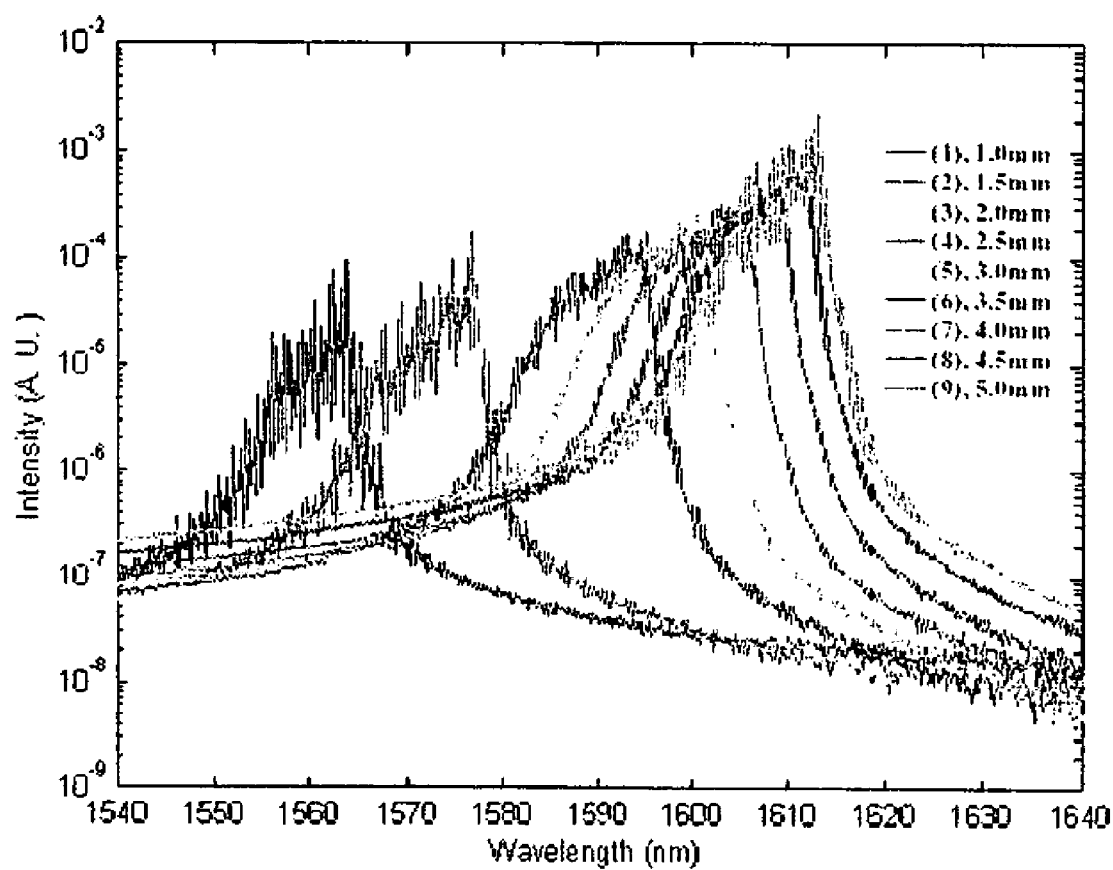
FIG. 6 depicts the experiment result of spectrum shifts when object moves in detecting range. Which could easily judged the distance change by different weight center of spectrum.

Referring to FIG. 5(A), the light emitting unit 10 provides a light source to the light dispersing unit 11. Referring next to FIG. 5(B), the rays with different wavelengths in the light source are respectively focused onto the focal points with different intervals by the light dispersing unit 11 (such focal points are not illustrated), and the reflector 16 is disposed in the centre of the inner circle of the hollow cylinder 20 and within the range of the such focal points, thus, referring to FIG. 5(C), the reflector 16 can reflect the rays at a certain focal point to the inner wall 200 of the hollow cylinder 20, and the rays are then reflected or scattered from the inner wall 200 of the hollow cylinder 20 (as shown in FIG. 5(D)) back to the inner radius measuring apparatus (as shown in FIG. 5(E)). Finally referring to FIG. 5(F), the rays can be sent to the wavelength measuring unit 12 for measuring the wavelength thereof.

The technical feature disclosed in this embodiment is that by disposing the reflector 16 in the centre of the inner circle of the hollow cylinder 20 and within the range of these focal points, the rays reflected or scattered by the inner wall 200 of the hollow cylinder 20 can be reflected again, and the wavelength of the rays reflected by the reflector 16 is measured by the wavelength measuring unit 12, such that the inner radius of the hollow cylinder 20 can be learned from the wavelength of the reflected rays. This embodiment adopts the implementing state of the second embodiment, accordingly, a partial penetrating component 14 is also provided on the surface of the light emitting component 100 for providing transmission for the rays returned when the measured object is moving within the range of the focal points, and the partial penetrating component can be embodied as a partial penetrating optical coating. In addition, a second modulating component 15 is also further provided between the wavelength measuring unit 12 and the light emitting component 100 for receiving the light beam returned when the measured object is moving within the range of focal points and focusing the light beam into suitable light beam.

The various components in the apparatus for measuring the inner radius in the present invention will now be described in detail.

The reflecting component 16 can be embodied as one or a group composed of at least one of a turning mirror and a fiber with an oblique cut, and the hollow cylinder 20 can be, for example, applied in a motor sleeve, a screw nut, a water pipe and the like.

In addition, the exemplary implementations and principles of the above-described light emitting unit 10, light dispersing unit 11 and wavelength measuring unit 12 are identical to those of the various components described with relation to the apparatus for measuring displacement of the present invention. The inner radius of the hollow cylinder 20 can also be obtained when the implementing state of the first embodiment of the apparatus for measuring displacement of the present invention (with reference to FIG. 1) is applied in this embodiment.

In summary, the technical features and exemplary implementations of the present invention can be understood distinctly from the detailed description and the accompanying drawings. The objectives of measuring displacement of an object can be achieved by a simple and cost-effective measuring means through the light dispersing unit 11, the photoreaction principle of the measured object and various main wavelengths obtained by the wavelength measuring unit 12. Furthermore, given that a reflecting component 16 is configured in the centre of inner circle of the hollow cylinder 20, the inner radius of the hollow cylinder 20 can be measured by the principle of the above-described apparatus for measuring displacement, accordingly, the apparatus for measuring the inner radius can be created.

The present invention has been described using exemplary preferred embodiments above, however, it is to be understood that the scope of the present invention is not limited to the disclosed embodiments. On the contrary, it is intended to cover various modifications and similar changes. The scope of the claims, therefore, should be accorded the broadest interpretation so as to encompass all such modifications and similar arrangements.

What is claimed is:

1. An apparatus for measuring displacement of a moving object, comprising:
    light emitting means for providing a light source with multiple wavelengths or a spectrum;
    light dispersing means for receiving light from the light emitting means and respectively focusing rays with different wavelengths from the light source into different focal points with different intervals, and when the moving object is moving within a dispersing range of the focal points, the light dispersing means provides rays with different wavelengths returned by the moving object; and
    wavelength measuring means for measuring the wavelengths of the rays returned when the moving object is moving within the dispersing range of the focal points, such that the displacement of the moving object is learned from variation of the measured wavelengths of the returned rays,
    wherein the light emitting means comprises a light emitting component for providing the light source, and a penetrating component is provided on a surface of the light emitting component where the light source is not provided, for providing a transmission channel for the rays that are returned by reflection or dispersion when the moving object is moving within the dispersing range of the focal points.

2. The apparatus of claim 1, wherein the light emitting means further comprises:
    a first modulating component for receiving the light source from the light emitting component and modulating the light source into applicable light beams.

3. The apparatus of claim 1, further comprising a first optical signal separating component provided between the light dispersing means and the wavelength measuring means, for passing the rays with different wavelengths returned when the moving object is moving within the dispersing range of the focal points to the wavelength measuring means.

4. The apparatus of claim 3, wherein the wavelength measuring means comprises:
    a second optical signal separating component for receiving the rays from the first optical signal separating component and separating the rays into a first light beam and a second light beam;
    a first filtering component for receiving the first light beam and attenuating the first light beam to a third light beam;
    a first photosensor for receiving the third light beam and measuring a first light intensity of the third light beam; and
    a second photosensor for receiving the second light beam and measuring a second light intensity of the second light beam, such that a primary wavelength of the rays, which are returned by reflection or dispersion when the moving object is moving within the dispersing range of the focal points, is learned by comparing the first light intensity and the second light intensity.

5. The apparatus of claim 1, further comprising a second modulating component provided between the wavelength measuring means and the light emitting component, for receiving the rays reflected or scattered when the moving object is moving within the dispersing range of the focal points and for modulating the rays into applicable light beams.

6. The apparatus of claim 5, wherein the wavelength measuring means comprises:
    a third optical signal separating component for receiving the rays from the second modulating component and separating the rays into a fourth light beam and a fifth light beam;
    a second filtering component for receiving the fourth light beam and attenuating the fourth light beam to a sixth light beam;
    a third photosensor for receiving the sixth light beam and measuring a third light intensity of the sixth light beam; and
    a fourth photosensor for receiving the fifth light beam and measuring a fourth light intensity of the fifth light beam, such that the wavelengths of the rays reflected or scattered when the moving object is moving within the dispersing range of the focal points are learned by comparing the third light intensity and the fourth light intensity.

7. A method for measuring displacement of a moving object, comprising the steps of:

provideing a light source by a light emitting means;

respectively focusing rays with different wavelengths in the light source into focal points with different intervals, and when the moving object is moving within a dispersing range of the focal points, providing the rays with different wavelengths being returned by the moving object; and measuring the wavelengths of the rays returned when the moving object is moving within the dispersing range of the focal points, such that the displacement of the moving object is learned from variation of the measured wavelengths, wherein the light emitting means comprises a light emitting component, and a penetrating component is provided on a surface of the light emitting component where the light source is not provided, for providing a transmission channel for the rays returned when the moving object is moving within the dispersing range of the focal points.

8. The method of claim 7, wherein the light emitting means further comprises:

a first modulating component for receiving the light from the light emitting component and modulating the light into applicable light beams.

9. The method of claim 7, wherein the rays with different wavelengths returned when the moving object is moving within the dispersing range of the focal points are passed via a first optical signal separating component to a wavelength measuring means that is for measuring the wavelengths of the returned rays.

10. The method of claim 9, wherein the wavelength measuring means comprises:

a second optical signal separating component for receiving the rays from the first optical signal separating component and separating the rays into a first light beam and a second light beam;

a first filtering component for receiving the first light beam and attenuating the first light beam to a third light beam;

a first photosensor for receiving the third light beam and measuring a first light intensity of the third light beam; and a second photosensor for receiving the second light beam and measuring a second light intensity of the second light beam, such that the wavelengths of the rays returned when the moving object is moving within the dispersing range of the focal points are learned by comparing the first light intensity and the second light intensity.

11. The method of claim 7, wherein a second modulating component is further provided between the wavelength measuring means and the light emitting component, for receiving the rays returned when the moving object is moving within the dispersing range of the focal points and for modulating the rays into applicable light beams.

12. The method of claim 11, wherein the wavelength measuring means comprises:

a third optical signal separating component for receiving the rays from the second modulating component and separating the rays into a fourth light beam and a fifth light beam;

a second filtering component for receiving the fourth light beam and attenuating the fourth light beam to a sixth light beam;

a third photosensor for receiving the sixth light beam and measuring a third light intensity of the sixth light beam; and a fourth photosensor for receiving the fifth light beam and measuring a fourth light intensity of the fifth light beam, such that a primary wavelength of the rays returned when the measured object is moving within the dispersing range of the focal points is learned by comparing the third light intensity and the fourth light intensity.

13. An apparatus for measuring displacement of an object, comprising:

light emitting means for emitting light with multiple wavelengths;

light dispersing means for receiving light from the light emitting means and focusing light rays with different wavelengths at different focal points within a detection region; and wavelength measuring means for measuring the wavelength of light rays reflected by the object when the object is in the detection region, wherein the light emitting means comprises a light source that includes a light emitting component, and further comprising a penetrating component on a surface of the light emitting component where the light source is not provided, for providing a transmission channel to the wavelength measuring means for the light rays that are reflected by the object when the object is in the detection region.

14. The apparatus of claim 13, wherein the wavelength measuring means comprises, means for splitting light rays reflected to the wavelength measuring means into first and second light beams, a first photosensor to sense the first light beam, means for attenuating the second light beam as a function of wavelength, and a second photosensor to sense the attenuated second light beam.

15. The apparatus of claim 14, wherein the means for attenuating comprises an optical filter.

* * * * *